United States Patent
Xu et al.

(10) Patent No.: US 8,068,120 B2
(45) Date of Patent: Nov. 29, 2011

(54) GUARD BAND CLIPPING SYSTEMS AND METHODS

(75) Inventors: Yunjie Xu, Shanghai (CN); Arthur Weng, Milpitas, CA (US)

(73) Assignee: Via Technologies, Inc., Taipei (TW)

( * ) Notice: Subject to any disclaimer, the term of this patent is extended or adjusted under 35 U.S.C. 154(b) by 936 days.

(21) Appl. No.: 12/044,554

(22) Filed: Mar. 7, 2008
(Under 37 CFR 1.47)

(65) Prior Publication Data

US 2009/0225098 A1  Sep. 10, 2009

(51) Int. Cl.
*G09G 5/00* (2006.01)
*G06T 1/20* (2006.01)

(52) U.S. Cl. .................... 345/620; 345/619; 345/506

(58) Field of Classification Search .............. 345/506, 345/619, 620, 621, 622, 623, 624
See application file for complete search history.

(56) References Cited

U.S. PATENT DOCUMENTS

| | | | |
|---|---|---|---|
| 4,888,712 A | 12/1989 | Barkans et al. | |
| 5,720,019 A * | 2/1998 | Koss et al. ................... | 345/620 |
| 5,986,669 A * | 11/1999 | Kirkland ...................... | 345/620 |
| 6,052,128 A * | 4/2000 | Narayanaswami et al. ... | 345/620 |
| 6,169,554 B1 * | 1/2001 | Deering ........................ | 715/764 |
| 6,359,630 B1 * | 3/2002 | Morse et al. ................. | 345/620 |
| 6,476,808 B1 | 11/2002 | Kuo et al. | |
| 6,518,965 B2 | 2/2003 | Dye et al. | |
| 6,577,305 B1 | 6/2003 | Duluk, Jr. et al. | |
| 6,686,924 B1 | 2/2004 | Mang et al. | |
| 7,292,242 B1 * | 11/2007 | Wittenbrink et al. ......... | 345/421 |
| 7,705,845 B1 * | 4/2010 | Parikh et al. ................. | 345/421 |
| 2003/0095137 A1 | 5/2003 | Lu et al. | |
| 2004/0111452 A1 * | 6/2004 | Sakamoto et al. ........... | 708/160 |
| 2005/0030320 A1 | 2/2005 | Munshi et al. | |
| 2006/0061596 A1 | 3/2006 | Jiao | |
| 2007/0046685 A1 * | 3/2007 | Lessieux ....................... | 345/581 |
| 2007/0291044 A1 * | 12/2007 | Xu et al. ....................... | 345/582 |
| 2008/0074415 A1 * | 3/2008 | Woo et al. .................... | 345/419 |
| 2008/0094412 A1 * | 4/2008 | Jiao et al. ..................... | 345/621 |

OTHER PUBLICATIONS

Akely, K., Hanrahan, P.; "Real-Time Graphics Architecture;" http://www.graphics.stanford.edu/courses/cs448a-01-fall' Fall 2001; pp. 1-20.
Taiwan Office Action dated Aug. 30, 2011.

* cited by examiner

*Primary Examiner* — Kee M Tung
*Assistant Examiner* — Jacinta M Crawford
(74) *Attorney, Agent, or Firm* — Thomas, Kayden, Horstemeyer & Risley, LLP

(57) ABSTRACT

The present disclosure provides embodiments of guard band clipping systems and methods. One guard band clipping system embodiment, among others, includes a vertex processor configured to convert transformed vertex data to integer screen space data and pass the transformed vertex data downstream in a graphics hardware pipeline, and a guard band clipping module coupled to the vertex processor and a guard band arithmetic logic unit coupled to the guard band clipping module, the guard band clipping module configured to determine whether a primitive corresponding to the transformed vertex data is to be clipped and, based on that determination, forward the primitive to the guard band arithmetic logic unit to perform guard band clipping.

16 Claims, 7 Drawing Sheets

GUARD BAND CLIPPING SYSTEMS AND METHODS

TECHNICAL FIELD

The present disclosure is generally related to data processing systems, and more particularly, is related to computer graphics systems and methods.

BACKGROUND

Computer graphics is the art and science of generating pictures, images, or other graphical or pictorial information with a computer. Generation of the pictures or images is commonly called rendering. Generally, in three-dimensional (3D) computer graphics, geometry that represents surfaces (or volumes) of objects in a scene is translated into pixels (picture elements), stored in a frame buffer, and then displayed on a display device.

In rendering a picture or image, an object undergoes various processing through various stages of a pipeline while progressing through various coordinate systems, often referred to as spaces. Referring to FIG. 1, the rendering process 10 is shown broadly as progressing from model space 102, to world space 104, to view space 106, to clip space 108, and then to screen space 110. In some implementations, the process may circumvent the world spaces 104 and skip directly from model space 102 to view space 106. Briefly, the model space 102 represents an original coordinate system whereby the particular object to be included in a displayed scene has not been transformed. The model space 102 provides a forum by which the user can manipulate an object on a screen through the use of model transforms. The user may seek to orient or align the object in various manners, shapes, and/or sizes with the help of a user interface to a computer monitor. That is, through a user interface, the user can direct a host processor to perform modifications via various model transforms applied to the object or model, with the result that the model space 102 has evolved to the world space 104.

From the world space 104, further transforms (e.g., view transforms) are applied to the vertices of the transformed object to facilitate projection and clipping, hence evolving into the view space 106. In the view space 106 (also called camera space), various functions take place, such as adding or modifying lighting and/or shading, trivial rejection, and creating a view volume, that enable a determination of what objects can be viewed by the camera and what objects cannot be viewed by the camera. For instance, a view frustum that comprises near and far clipping planes is typically created. Objects of a rendered 3-D scene that do not fit between the near and far clip planes and the sides of the frustum are omitted from processing, hence reducing clipping operations.

In the clip space 108, the coordinates of the frustum created in the view space 106 are normalized (e.g., via a perspective divide) to simplify clipping complexity, and then clipping is performed.

Once the clipping is performed, the primitives within the view volume are mapped to screen space 110 and rendered on a display device. Note that in some implementations, the various aforementioned processes may take place in different and/or additional spaces.

Referring to the clip space 108, various techniques are employed to reduce the number of primitives (e.g., triangles) that need to be clipped. One technique often used is referred to as guard band clipping. In guard band clipping, the near and far clipping planes created in the view space 106 remain unchanged, but the clipping frustum is extended beyond a desired viewport. That is, overall, two frusta are created: a guard band frustum and the smaller viewport frustum. Conditions for rendering and clipping may be implemented according to the following approach. If triangles are located outside the viewport, they are completely discarded. Additionally, triangles are rendered without clipping if within the viewport. Further, clipping is to be implemented if triangles cross both the viewport and guard band frustum or if the triangles cross the near and far clipping planes.

Though guard band clipping offers a conservative approach to rendering (e.g., more triangles may be passed than are needed at rasterization), that conservatism is balanced by a reduction in clipping operations. That is, guard band clipping reduces how often the host processor (e.g., central processing unit or CPU) performs clipping by accepting triangles that are partly off-screen, allowing the host processor to perform simpler and faster culling and clip tests in most cases. Nevertheless, when triangles are to be clipped, the process is arduous and hence time consuming. In conventional systems, clipping is typically performed via execution of one of many different algorithms (e.g., Cohen-Sutherland, Sutherland-Hodgman, Weiler-Atherton, Patrick Gilles Maillot, etc.) on a host processor. Such algorithms often require full sorting (e.g., of view frustum clipping codes), the determination of intersections with view volume clipping planes, and the interpolation of each parameter (e.g., alpha, fog, etc.) of the vertex, which can collectively be a computationally intensive approach that does not map well onto hardware.

SUMMARY

Embodiments of the present disclosure provide guard band clipping systems and methods. Briefly described, one guard band clipping method embodiment, among others, comprises passing transformed vertex data downstream in a graphics hardware pipeline, determining at a guard band clipping module whether a primitive corresponding to the transformed vertex data is to be clipped, and based on the determination, performing guard band clipping and performing interpolation to define coordinates of new clipped vertices at a guard band clipping arithmetic logic unit.

One guard band clipping system embodiment, among others, comprises a vertex processor configured to convert transformed vertex data to integer screen space data, calculate clipcodes, and pass the transformed vertex data downstream in a graphics hardware pipeline, and a guard band clipping module coupled to the vertex processor and a guard band arithmetic logic unit coupled to the guard band clipping module, the guard band clipping module configured to determine whether a primitive corresponding to the transformed vertex data is to be clipped and, based on that determination, forward the primitive to the guard band arithmetic logic unit to perform guard band clipping.

One guard band clipping system embodiment, among others, comprises a state machine configured to receive state data and transformed vertices, a vertex index buffer coupled to the state machine, a vertex buffer indexed by the vertex index buffer, the vertex buffer configured to save the transformed vertices, a vertex processor coupled to the vertex index buffer, the vertex processor configured to generate clip codes for vertices and perform perspective correction of attributes corresponding to vertices resulting from clipped primitives; a trivial rejection module configured to perform trivial rejection based on evaluation of the clip codes, a guard band clipping module configured to determine whether guard band clipping is to be performed on a primitive based on evaluation of the clip codes, and a guard band clipping arithmetic logic unit configured to clip the primitive responsive to the determination that the primitive is to be clipped, the guard band clipping arithmetic logic unit further configured to perform interpolation to define coordinates of new clipped vertices.

Other systems, methods, features, and advantages of the present disclosure will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosed systems and methods can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various embodiments of guard band clipping systems and methods (herein, collectively referred to as GB clipping system(s) for brevity). Such GB clipping systems provide a fast and simple, hardware-based implementation for guard band clipping. In one embodiment, clipping is performed by one or more fixed point arithmetic logic units (ALU) of a graphics processor unit, obviating the need for host processor intervention in contrast to conventional systems and accelerating the clipping process. In such an embodiment, clipping is performed in screen space, and trivial rejection is implemented in clip or screen space. Through implementation in dedicated hardware, the various embodiments of GB clipping systems off-load the host processor, and provide for efficient and fast computations and reduced complexity.

Figure 1:
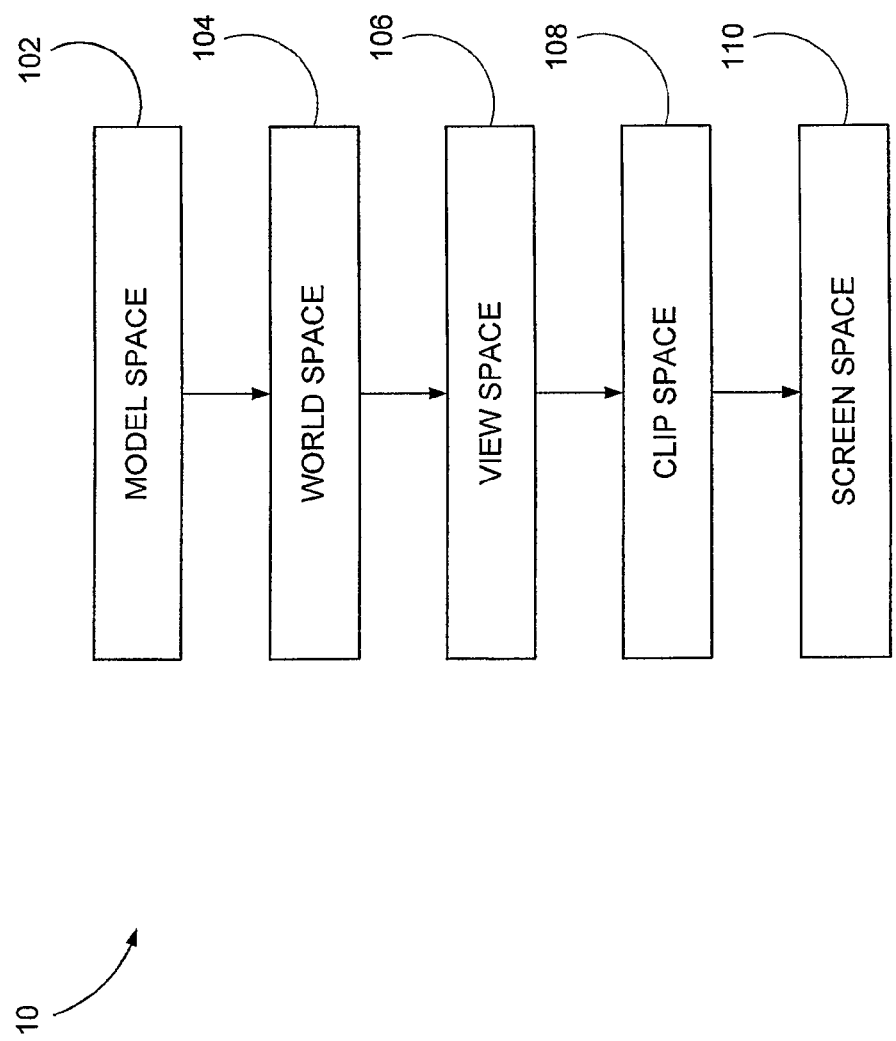
FIG. 1 is a block diagram that conceptually illustrates the various coordinate systems or spaces involved in rendering an image in a graphics processor system.
Figure 2:
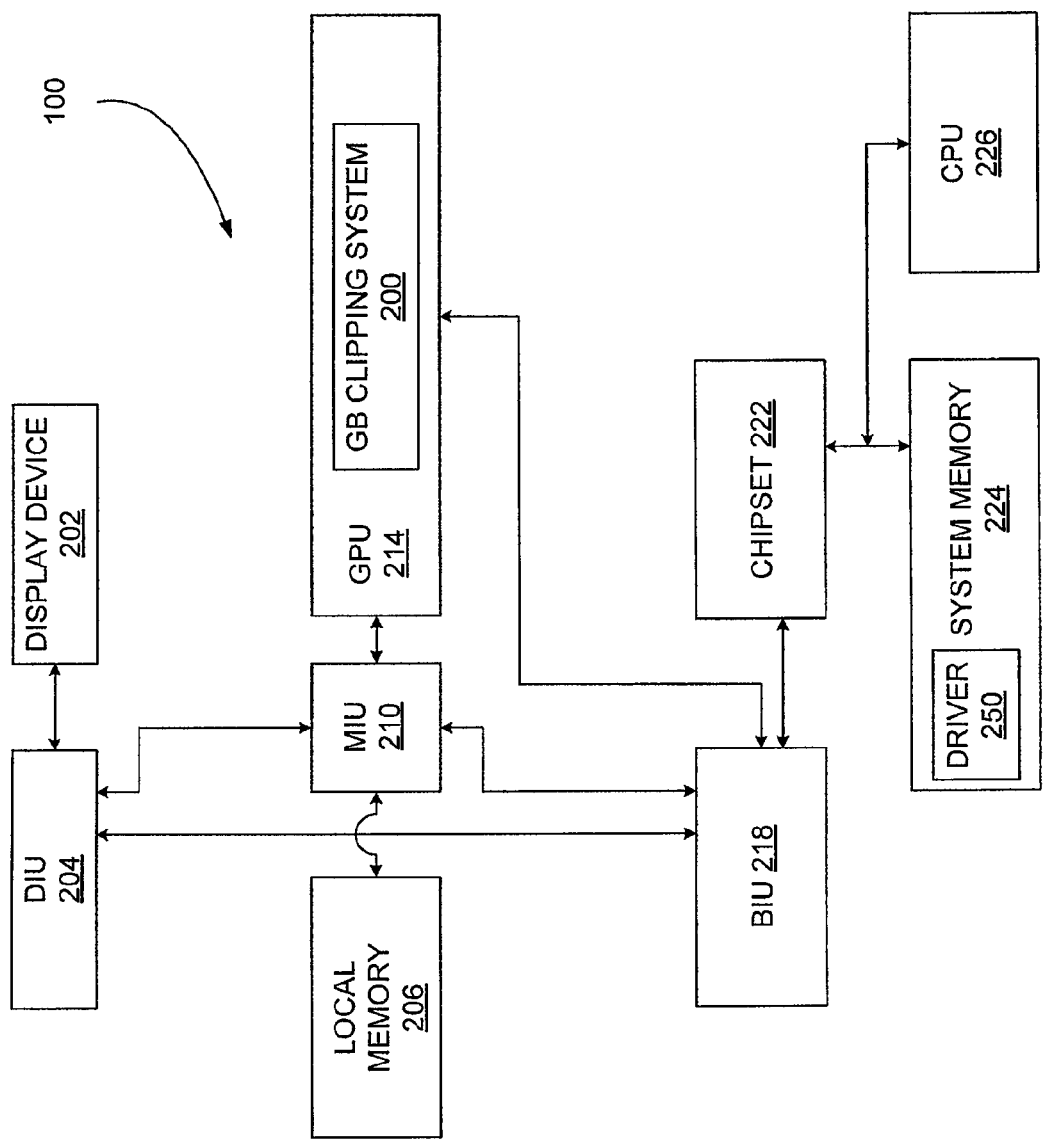
FIG. 2 is a block diagram of an embodiment of a graphics processor system in which embodiments of guard band clipping systems (and methods) are implemented.

FIG. 2 is a block diagram of an embodiment of a graphics processor system 100 in which embodiments of guard band (GB) clipping systems 200 are implemented. In some implementations, the graphics processor system 100 may be configured as a computer system. The graphics processor system 100 may comprise a display device 202 driven by a display interface unit (DIU) 204 and local memory 206 (e.g., which may comprise a display buffer, texture buffer, command buffer, etc.). Local memory 206 may also be referred to interchangeably herein as a frame buffer or storage unit. Local memory 206 is coupled to a graphics processing unit (GPU) 214 through a memory interface unit (MIU) 210. The MIU 210, GPU 214, and DIU 204 are coupled in one embodiment to a bus interface unit (BIU) 218. In one embodiment, the BIU 218 may be peripheral component interconnect express (PCIE) compatible, and configured to use a graphics address remapping table (GART), although other memory mapping mechanisms may be employed. The GPU 214 includes the GB clipping system 200, as described below. Although shown as a component of the GPU 214, in some embodiments, the GB clipping system 200 may include one or more additional components of the graphics processor system 100 that are shown, or different components.

The BIU 218 is coupled to a chipset 222 (e.g., north bridge chipset) or switch. The chipset 222 comprises interface electronics to strengthen signals from a central processing unit (CPU) 226 (also referred to herein as a host processor) and to separate signals to and from a system memory 224 from those signals going to and from input/output (I/O) devices (not shown). Although a PCIE bus protocol is described, other manners of connection and/or communication between the host processor 226 and the GPU 214 may be implemented in some embodiments (e.g., PCI, proprietary high-speed bus, etc.). The system memory 224 also comprises driver software 250, which communicates instructions or commands through the use of the CPU 226 to registers and a command stream processor (CSP) in the GPU 214.

Additional graphics processing units may be employed in some embodiments, coupled for instance to the components shown in FIG. 2 through the chipset 222 via a PCIE bus protocol. In one embodiment, the graphics processor system 100 may embody all of the components shown in FIG. 2, or fewer and/or different components than those shown in FIG. 2. Further, in some embodiments, additional components may be used, such as a south bridge chipset coupled to the chipset 222.

In certain embodiments, the GB clipping system 200 is implemented in hardware, including any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), state machine, etc.

Figure 3:
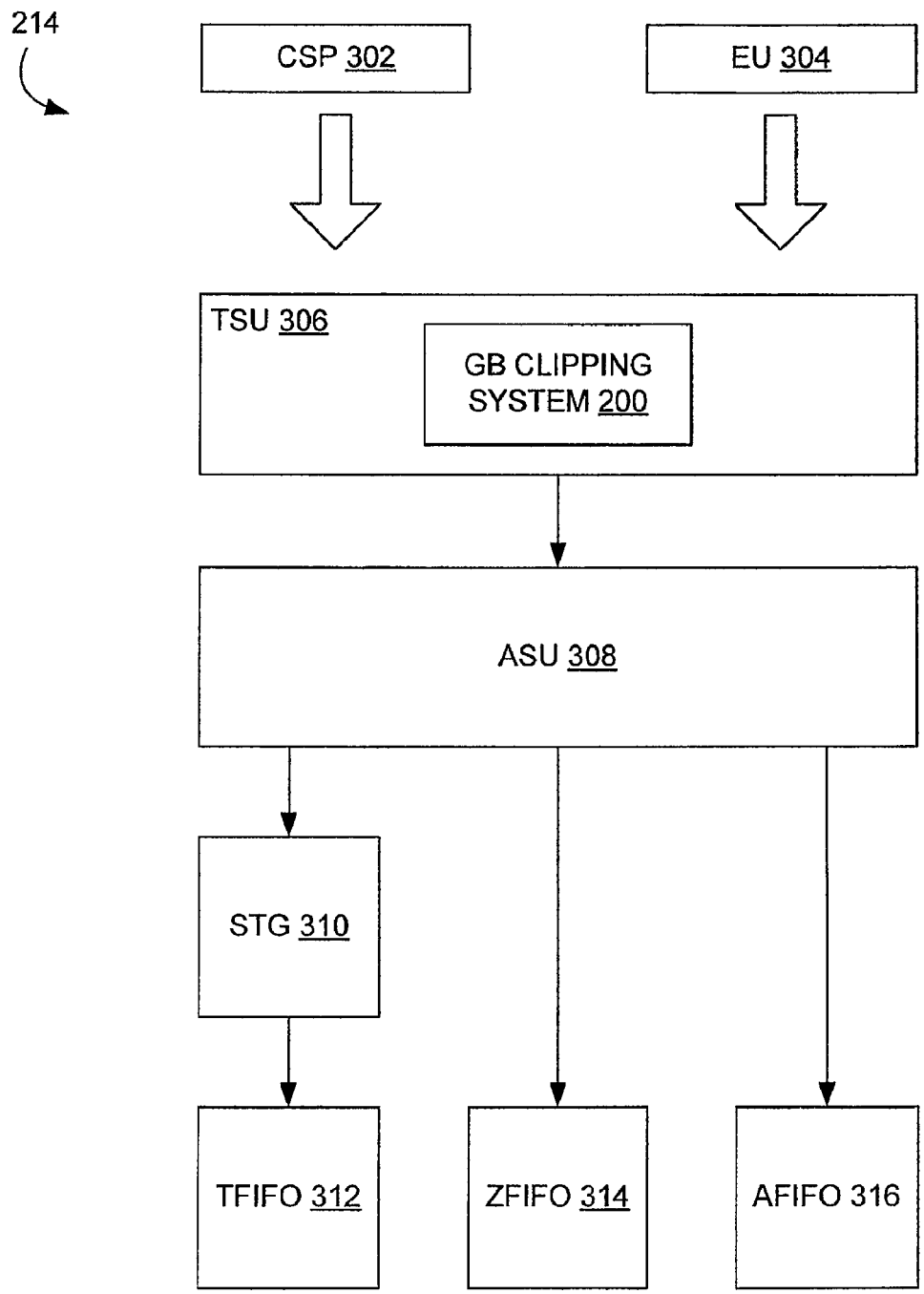
FIG. 3 is a block diagram that illustrates an embodiment of the graphics processing unit and the guard band clipping system shown in FIG. 2.

FIG. 3 is a block diagram that illustrates an embodiment of the graphics processing unit 214 and GB clipping system 200 shown in FIG. 2. Additional or fewer components to those shown in FIG. 3 may also be included in some embodiments. For instance, each module or unit described below may have its own internal register or registers, not shown, used by a module co-located with the register or shared with different modules. The graphics processing unit 214 is configured with a pipeline architecture, including a command stream processor (CSP) 302, execution unit (EU) pool 304, a triangle set-up unit (TSU) 306 that in one embodiment incorporates the GB clipping system 200, an attribute set-up unit (ASU) 308, span and tile generation (STG) unit 310, a texture first-in, first out (TFIFO) unit 312, a Z FIFO (ZFIFO) unit 314, and an ASU FIFO (AFIFO) unit 316.

The CSP 302 provides state data (sourced from the driver 250) and the EU pool 304 (e.g., with vertex shader functionality incorporated therein) provides transformed vertex data (which also could be sourced from the driver software 250) to the TSU 306. In some embodiments, the vertex data can be provided by a fixed function vertex shader processor. Based on the received data, the TSU 306 assembles and sets up primitives (e.g., lines, triangles, composed primitives like polylines, triangle strips, fans, etc.) for blank rasterization, and reprocesses data for the ASU 308. For example, the TSU 306 carries out such well-known tasks as view port transformation, trivial rejection, bounding box generation, and culling. Additionally, the TSU 306 carries out guard band clipping through the use of the GB clipping system 200.

The TSU 306 provides data resulting from these above-described processes to the ASU 308, which sets up attribute deltas (e.g., color, depth, alpha, fog, etc.) for each respective primitive to be rendered (e.g., via interpolation on the pixel level). Such attribute deltas are sent to the ZFIFO unit 314 and AFIFO unit 316. For instance, the ASU 308 comprises a Z (depth), attribute delta processing unit (e.g., ALU, etc.) configured to perform such calculations in conjunction with the ZFIFO unit 314, where the deltas are written for further use in Z-test units in known manner. The ASU 308 also cooperates with the AFIFO unit 316 to perform well-known pixel color and texture attribute delta processing for further interpolation at the pixel level. The ASU 308 also bypasses TSU edge functions to the STG 310, which provides tile generation functionality whereby the data objects are segmented into tiles (e.g., 8×8, 16×16, etc.) and passed to the TFIFO unit 312.

Figure 4:
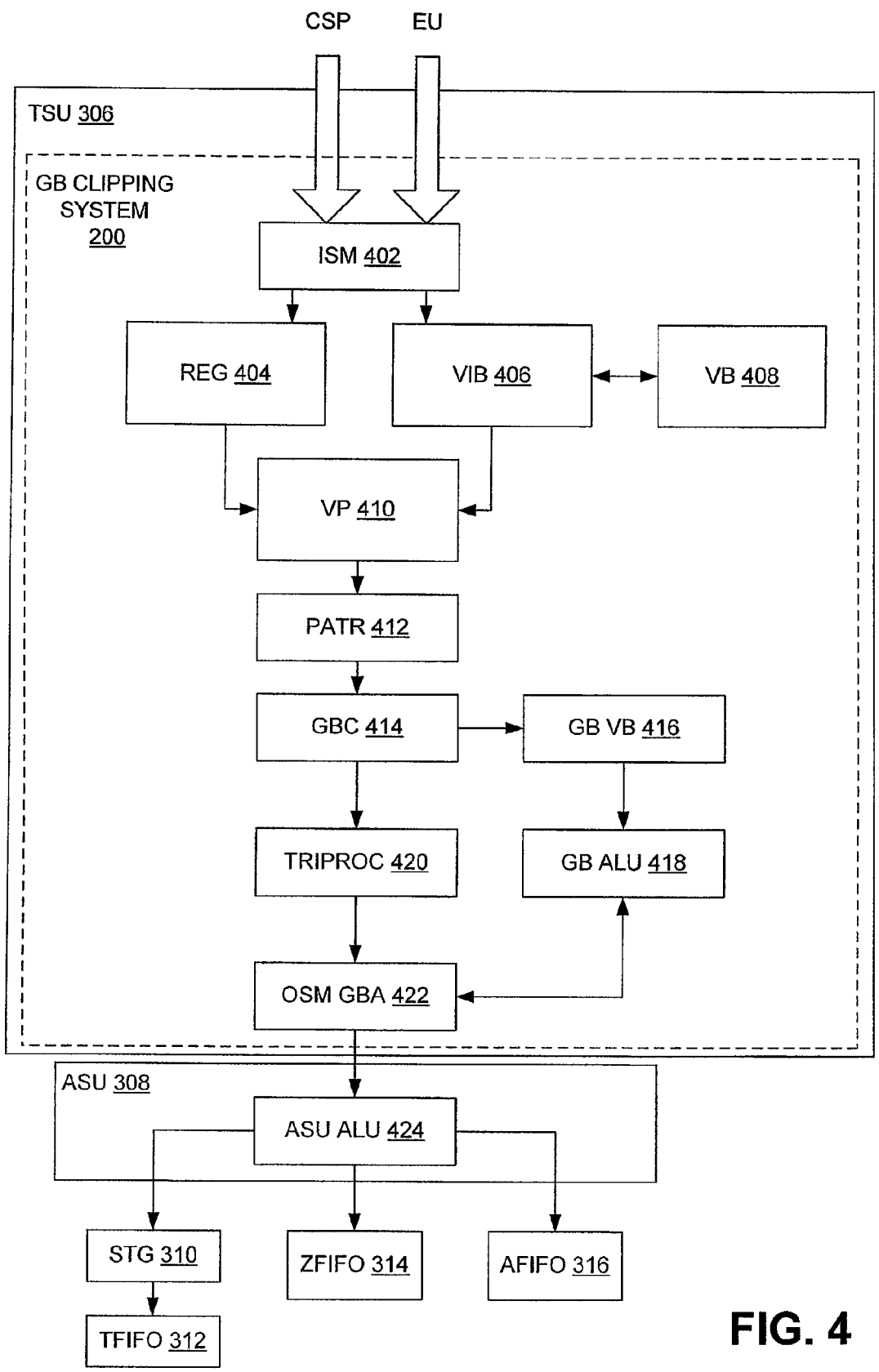
FIG. 4 is a block diagram that illustrates an embodiment of the guard band clipping system as shown in FIG. 3.

FIG. 4 is a block diagram that illustrates select components of an embodiment of the GB clipping system 200 shown in FIG. 3. As described above, the GB clipping system 200, in one embodiment, is a part of the TSU 306, and comprises an input state machine (ISM) 402, a register module 404, a vertex index buffer (VIB) 406, a vertex buffer (VB) 408, a vertex processor 410, a primitive assembler/trivial rejection (PATR) module 412 (also referred to herein as trivial rejection module), a guard band clipping (GBC) module 414, a guard band vertex buffer (GBVB) 416, a guard band ALU (GB ALU) 418, a triangle processor (TRIPROC) 420, and an output state machine for guard-banded attributes (OSM GBA) module 422, the latter which outputs a result of guard banded vertex attributes to the ASU 308 for further set-up. Also shown is the ASU 308, which comprises, among other components, an ASU ALU 424 that feeds data to the STG 310, AFIFO unit 316, and ZFIFO unit 314 as explained above in association with FIG. 3. Some embodiments of the GB clipping system 200 may encompass fewer, greater, or different components.

In general, guard band clipping is performed after vertice coordinates (and corresponding attributes) are perspectively corrected and mapped to integer screen coordinates in the VP 410, enabling a match of linear interpolation requirements in screen space. In one embodiment, perspective correction for all attributes is achieved simultaneously with XYZ coordinate determination, with the understanding that some vertices may get clipped later in the GB ALU 418 along with calculation of values for the resultant new vertices. Thus, as is explained further below, the VP 410 serves at least two hardware modules, namely the VIB 406 and the GBC module 414. In one embodiment, the GBC module 414 is granted a higher priority than normal stage processing implemented between the VP 410 and the VIB 406, and hence requests by the GBC module 414 pertaining to clip operations may interrupt current VP processing from the VIB 406.

The ISM 402 is configured to synchronize EU pool data (e.g., states, commands, transformed vertex data) and CSP data (e.g. states, commands). The ISM 402 sends the command and state data to the register module 404 and the transformed vertex data to the VIB 406. The VIB 406 writes the vertex data to the VB 408. The VIB 406 is configured to determine a reference count of each vertex, depending on its position in a primitive (e.g., strip). When the primitive is rejected or finished (the latter sent to the ASU 308), the VIB 406 updates (on its own or upon request by a downstream module) the reference count of all vertices of the particular primitive at the same or substantially same time. The VB 408 accepts the transformed vertex data passed from the ISM 402 when any of the VB entries are free (e.g., when all primitives have been rejected or sent to the ASU 308).

The VP 410 receives clipping space vertex data from the VB 408 (using indices via the VIB 406) and performs perspective correction and view port transformation to convert the data to integer screen space. The VP 410 also generates (and hence calculates) clip codes for the vertices, which are used by the modules located downstream to determine whether trivial rejection or guard band clipping is to be employed. In one embodiment, the VP 410 comprises a pipeline (e.g., multi-stage) architecture. Thus, during normal processing, the VP 410 processes all upcoming vertices requested by the VIB 406 and pushes the data to the PATR module 412 and the GBC module 414.

Normal processing by the VP 410 with the VIB 406 continues until the GBC module 414 signals to the VP 410 that a clipping event has transpired. In general, responsive to the generation of a new vertex based on the clipping operation, the GBC module 414 requests that the VP 410 interrupt processing from the VIB 406, and XYZ vertex calculations and attribute perspective correction are repeated by the VP 410. As indicated above, the VP 410 accomplishes such tasks by temporarily storing all current data in an internal buffer, and serving the GBC request immediately. Upon completion of the GBC request, processing from the VIB 406 resumes. In particular, for primitives that are to undergo guard band clipping, the VP 410 obtains clipping space data from the VIB 406, and then generates new vertices for the clipped primitives. For instance, when a guard band clipping event occurs in later pipeline stages (e.g., as signaled by the GBC module 414), the VP 410 copies data from the VIB 406, and temporarily stores the data (used for undergoing current stage processing) to a temporary buffer residing, in one embodiment, within the VP 410. After serving the GBC request, the VP 410 accesses the temporarily stored data and continues processing data with the VIB 406.

Downstream of the VP 410, the PATR module 412 performs trivial rejection of all vertices outside the view port (as indicated by the clip codes generated by the VP 410). One or more trivial rejection techniques may be employed (in screen space or clipping space), including well-known negative W, scissor window, Z near, Z far, cull distance tests, and clipping plane tests.

Primitive data is passed to the GBC module 414, which determines whether guard band clipping is required based on the clip codes generated by the VP 410, the clip codes indicating to the GBC module 414 the location of primitive vertices in comparison to the guard band and view port frustra. If clipping is required, vertice data is passed to the GB VB 416 and clipping computations are performed at the GB ALU 418. Clipped triangles are passed to the triangle processor 420, where processing such as calculating a determinant, bounding-box, edge functions, and attribute functionality are performed according to methods well-known in the art. The output of the triangle processor 420 is provided to the OSM GBA module 422, as indicated above. The output (vertex attributes) of the OSM GBA module 422 is passed to the ASU ALU 424, and then to the STG 310 and various FIFOS as explained above. The ASU ALU 424 receives clipped or (guardbanded) vertex attributes (Z, color, textures, etc.) from the OSM GBA module 422 and calculates deltas for further interpolation in pixel processing stages. Hence, the ASU ALU 424 serves to forward triangle geometry setup data from the triangle processor 420 to the STG 310. Attribute deltas and any following state information are written to the ZFIFO unit 314 and AFIFO unit 316.

Figure 5:
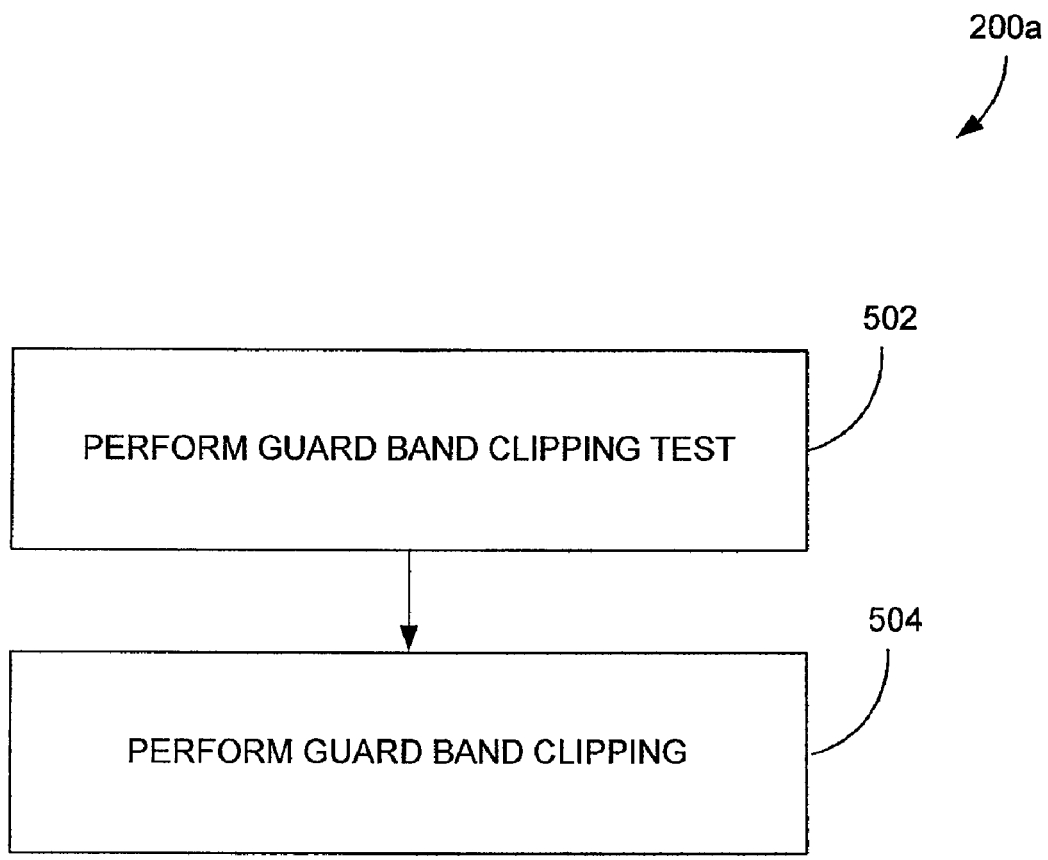
FIGS. 5-7 are flow diagrams that illustrate an embodiment of a guard band clipping method for the system shown in FIG. 4.
Figure 6:
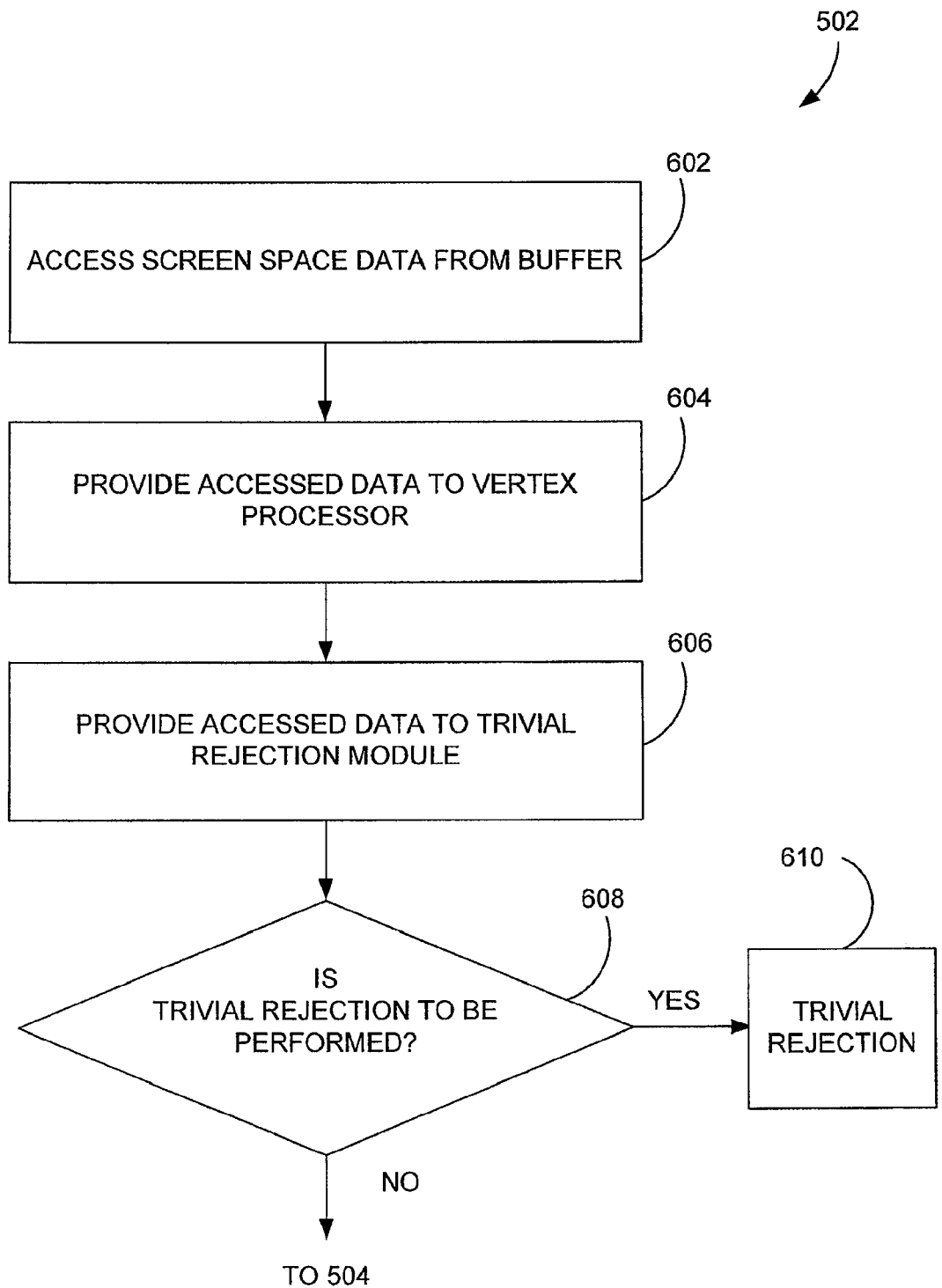
Figure 7:
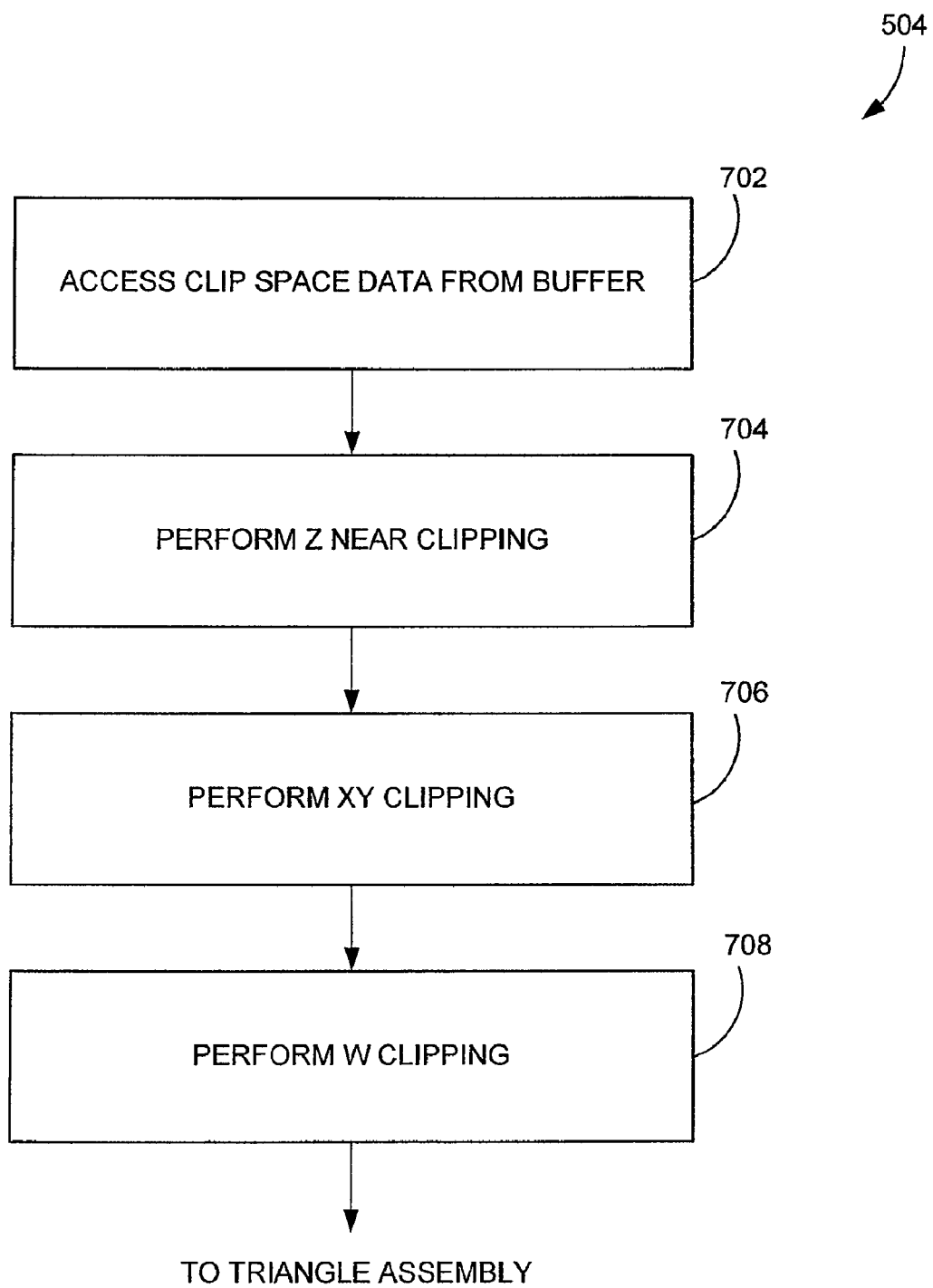

FIG. 5 is a flow diagram that illustrates an embodiment of a guard band clipping method, designated as 200a, and FIGS. 6 and 7 correspond to respective portions of the method 200a. The GB clipping method 200a performs a guard band clipping test (502). Referring to the method 502 shown further in FIG. 6, the VIB 406 accesses screen space data from the VB 408 (602), and provides the same to the VP 410 (604). In one embodiment, such access may be commenced after pipeline stages downstream of the GBC module 414 have become idle. Using pseudo code, the following illustrates a mechanism employed by the VP 410 to generate clip codes:

```
         wclip_flag = ( |w| < wnear ) || ( |w| > wfar ).
         xyclip_flag = x0.exp >= GB_range || y0.exp >= GB_range
         ||
                    x1.exp >= GB_range || y1.exp >=
GB_range ||
                    x2.exp >= GB_range || y2.exp >= GB_range
```

Briefly, the above-described pseudo code sets up a clip flag or a clip code for each vertex, which indicates to the GBC module 414 whether guard band clipping is to be performed or not. The variables wnear and wfar are configured by the driver software 250 and define the depth range in clipping space larger than the z range of [znear, zfar] in screen space. The GB_range corresponds to the GB range exponent value (e.g., 13, 23, etc.). The clipping space data (e.g., x0, y0, etc.) is accessed by the VIB 406 from the VB 408. Note that the VP 410 is configured to perform floating point (fp) arithmetic, where each number has a significand and exponent part.

As part of the guard band clipping test (502), the VIB 406 also passes the screen space data to the PATR module 412 (606), which makes a determination as to whether to perform a trivial rejection (608). The PATR module 412 may implement this determination by evaluating clip codes for the vertices of a given primitive (e.g., triangle). The clip codes describe the position of a vertex relative to the guard band, and are generated in the manner described above. Additionally, the clip codes are used later for survived triangles (e.g., untouched by the clipping process) to control interpolation of new vertices. The following pseudo code describes an embodiment of a process performed by the PATR module 412:

```
If ( wclip_flag | xyclip_flag )
    {
        Jump to GBC module 414
    }
    Else
    {
        Do trivial rejection using screen space data from
VIB 406
        1. Negative W rejection, i.e., if w0<=0 && w1<=0
           && w2<=0
        2. X/Y rejection against the viewport boundary
        3. znear rejection, i.e. if z0<0 && z1<0 && z2<0
        4. zfar rejection, i.e. if z0 > zfar && z1 > zfar &&
           z2 > zfar
    }
```

From the second portion of the above-described pseudo code, if trivial rejection is to be implemented, trivial rejection is performed (610) based, in one embodiment, on setting of vertex flags based on comparison to the ranges of the guard band in two dimensional (2D) space and Z or W using screen space data from the VIB 406. For instance, if all three vertices of triangle are out of the Z range (Z<0), the triangle is rejected. That is, a triangle may be rejected in case of a negative Z for all three vertices even if the conditions described in the above-pseudo code (pertaining to operations by the VP 410) are true and the triangle is inside the guard band. It is noted that the triangle is invisible because of the negative Z in all three vertices. One mechanism, among others, for implementing a trivial rejection comprises implementing a Znear test. In the Znear test, the following procedure is implemented on triangle segments corresponding to the various vertex combinations, such as hypothetical vertices $v_0v_1$, $v_1v_2$, $v_2v_0$, to generate clip flags on a Z range condition:

Need_Znear_Clipping=wclip_flag||Z0<0||Z1<0||Z2<0

For the first portion of the above pseudo code corresponding to the PATR module 412, triangles that are not trivially rejected may undergo guard band clipping (504). Referring to FIG. 7, the guard band clipping method 504 is further illustrated. In general, the following operations are performed for guard band clipping: (a) reject the triangle if all three vertices w≦0 (e.g., rejects completely invisible triangles with negative W (same as Z)); (b) perform xy-clip (based on a guard band border area defined by −w≦x≦w, −w≦y≦w (based on xy-clip code), for each XY clip plane (x=w, x=−w, y=w, y=−w)); and (c) perform W-clip (wnear≦w≦wfar, for each W clip plane (w=wnear, w=wfar). Explaining further, the GBC module 414 receives vertex data (for clipping) from the VB 408 (via VIB 406) (702), and Z near clipping is performed in the GB ALU 418 (704).

In Z near clipping, each vertex combination ($v_0v_1$, $v_1v_2$, $v_2v_0$) is clipped by the Z near plane in sequence. In one embodiment, barycentric interpolation is performed to define coordinates of new clipped vertices. For instance, using $v_1v_2$ as an example, the following pseudo code described an exemplary process (note that output buffer referenced below, in one embodiment, refers to the GB VB 416, and "r" represents the ratio of the new generated vertex derived from the two vertices of the edge; "r" is used in barycentric interpolation for any other attributes (e.g., RGB) besides XYZW):

```
1)      If v1.z ≧ 0 && v2.z ≧ 0, put v1 into output buffer, goto 4)
            If v1.z ≧ 0 && v2.z < 0, put v1 into output buffer, goto 3)
        If v1.z <0 && v2.z ≧ 0, goto 2)
        If v1.z<0 && v2.z <0, goto 4)
2)      swap v1, v2 (interpolate from the inside vertex to the outside vertex)
3)      Ratio = v1.z / (v1.z − v2.z)
            v.x = v1.x * (1−Ratio) + v2.x * Ratio
            v.y = v1.y * (1−Ratio) + v2.y * Ratio
            v.w = v1.w * (1−Ratio) + v2.w * Ratio
            v.r0 = v1.r0 * (1−Ratio) + v2.r0 *
            Ratio
            v.rI = v1.rI * (1−Ratio) + v2.rI *
            Ratio
            v.r2 = v1.r2 * (1−Ratio) + v2.r2 *
            Ratio
            put v into output buffer
4)      Move to the next edge
```

In one embodiment, subsequent to performing Z near clipping, XY clipping and W clipping is performed by the GB ALU 418 (706, 708). Subsequent to the Z near clipping procedure exemplified above, several of the clipped vertices are stored in the GB VB 416. If at least one vertex from these vertices resides inside a viewport, such a vertex resides within the guard band border described as −w≦x≦w, −w≦y≦w. Hence, for XY clipping, clipcodes are generated (e.g., by the VP 410) for each vertex and new vertices are generated (based on the clip procedure). In one embodiment, four (4) bits are used to describe a clipcode (e.g., left, right, bottom, top) for each vertex as follows:

$Bit_0 = (x < -w)$ $Bit_1 = (x > w)$ $Bit_2 = (y < -w)$ $Bit_3 = (y > w)3$

Continuing with the explanation of the XY clip procedure according to one embodiment, left, right, bottom, and top clipping is performed by the GB ALU 418. During each clipping stage, one or more buffers (e.g., including GB VB 416) are used to temporarily store the vertex data. For instance, one buffer may be used for the input, and another buffer may be used for the output. For example, the following pseudo code may be implemented by the GB ALU 418:

```
1)  Fetch v_f, v_2 from input buffer in sequence.
2)  If v_f.Bit_0 == 0 && v_2.Bit_0 == 0, put v_f into output buffer, goto 5)
    If v_f.Bit_0 == 0 && v_2.Bit_0 == 1, put v_f into output buffer, goto 4)
    If v_f. Bit_0 == 1 && v2. Bit_0 == 0, goto 3)
    If v_f. Bit_0 == 1 && v2. Bit_0 == 1, goto 5)
3)  swap v_f, v_2 (always interpolate from the inside vertex to the
    outside vertex
4)  dI = v_f.x + v_f.w
       d2 = v_2.x + v_2.w
       Ratio = dI / (dI –
       d2)
       v.x = v_f.x * (1–Ratio) + v_2.x * Ratio
       v.y = v_f.y * (1–Ratio) + v_2.y * Ratio
       v.w = v_f.w*(I–Ratio) + v_2.w * Ratio
       v.r_0 = v_f.r_0 * (1–Ratio) + v_2.r_0 * Ratio
       v.r_1 = v_f.r_1 * (1–Ratio) + v_2.r_1 * Ratio
       v.r_2 = v_f.r_2 * (1–Ratio) + v_2.r_2 *
       Ratio
          compute v's clipcode
          put v into output buffer
5)  If not swapped (v_f,v_2), v_f move forward to v_2
6)  If v_f is the first one of input buffer, end.
          Else v_2 move forward to the next vertex in GB VB
416, goto 2)
```

The GB VB 416 may store a plurality of vertices (e.g., eight (8)), which form a fan with vertex $v_0$ at the head, which is output to the triangle processor 420 along with a guard band flag. For instance, flags may be used to define the interpolation order for attribute values for clipped vertices. Note that, though described in the above-pseudo code as a parallel process, W clipping and XY clipping may be performed sequentially. The above-described process is followed by triangle assembly (e.g. performed by the GB ALU 418). After triangle assembly, attribute interpolation is performed at the ASU ALU 424 of the ASU 308. To calculate attributes for the new triangle(s), the ASU ALU 424 implements requests to the GB VB 416 for ratios and to the VB 408 for attributes.

The flow diagram of FIGS. 5-7 shows the architecture, functionality, and/or operation of a possible implementation of the GB clipping system 200 and corresponding method 200*a*. In this regard, each block represents various functionality of one or more modules. It should also be noted that in some alternative implementations, the functions noted in the blocks may occur out of the order noted in FIGS. 5-7. For example, two blocks shown in succession in FIG. 5 may in fact be executed substantially concurrently or the blocks may sometimes be executed in the reverse order, depending upon the functionality involved, as will be further clarified hereinbelow.

Though described above using barycentric interpolation, in some embodiments, other interpolation methods may be utilized.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

At least the following is claimed:

1. A guard band clipping system in a graphics processor, comprising:

a vertex processor configured to convert transformed vertex data to integer screen space data, calculate clipcodes and pass the transformed vertex data downstream in a graphics hardware pipeline, wherein the vertex processor is configured to perform normal processing of transformed vertex data through access to a vertex buffer by a vertex index buffer; and a guard band clipping module coupled to the vertex processor and a guard band arithmetic logic unit coupled to the guard band clipping module, the guard band clipping module configured to determine whether a primitive corresponding to the transformed vertex data is to be clipped and, based on that determination, forward the primitive to the guard band arithmetic logic unit to perform guard band clipping;

wherein, responsive to a guard band clipping operation performed by the guard band arithmetic logic unit, the guard band clipping module is further configured to request an interruption of the normal processing by the vertex processor.

2. The system of claim 1, further comprising the vertex index buffer coupled to the vertex buffer and the vertex processor, the vertex buffer configured to save the transformed vertex data and clipping space data.

3. The system of claim 1, wherein responsive to the interruption, the vertex processor recalculates vertex coordinates and clip codes for the recalculated vertex coordinates, performs perspective correction of attributes corresponding to the recalculated vertex coordinates, and maps the recalculated vertex coordinates to integer screen space.

4. The system of claim 1, further comprising a trivial rejection module configured to determine whether trivial rejection of primitives is to be performed based on clip codes passed from the vertex processor, and responsive to the determination, the trivial rejection module is configured to perform trivial rejection.

5. The system of claim 1, wherein the guard band clipping module is further configured to determine whether guard band clipping of primitives is to be performed based on clip codes passed from the vertex processor.

6. The system of claim 1, further comprising an attribute set-up unit configured to receive guard banded vertex attributes from the guard band clipping system and set up attribute deltas for each respective primitive to be rendered.

7. The system of claim 1, wherein the guard band clipping arithmetic logic unit is configured to perform barycentric interpolation to define coordinates of new clipped vertices.

8. A guard band clipping method, comprising:

passing transformed vertex data downstream in a graphics hardware pipeline;

determining at a guard band clipping module whether a primitive corresponding to the transformed vertex data is to be clipped; and based on the determination, performing guard band clipping and performing interpolation to define coordinates of new clipped vertices at a guard band clipping arithmetic logic unit processing of the transformed vertex data through access to a vertex buffer by a vertex index buffer;

responsive to a guard band clipping operation performed by the guard band arithmetic logic unit, requesting by the guard band clipping module an interruption of the normal processing by a vertex processor.

9. The method of claim 8, wherein the interpolation is barycentric interpolation.

10. The method of claim 8, further comprising saving the transformed vertex data and clipping space data in the vertex buffer indexed by the vertex index buffer.

11. The method of claim 8, further comprising, responsive to the interruption, the vertex processor:

recalculating vertex coordinates and clip codes for the recalculated vertex coordinates;

performing perspective correction of attributes corresponding to the recalculated vertex coordinates; and mapping the recalculated vertex coordinates to integer screen space.

12. The method of claim 8, further comprising determining by a trivial rejection module whether trivial rejection of primitives is to be performed based on clip codes passed from the vertex processor.

13. The method of claim 12, further comprising performing the trivial rejection by the trivial rejection module responsive to the determination.

14. The method of claim 8, further comprising determining by the guard band clipping module whether guard band clipping of primitives is to be performed based on clip codes passed from the vertex processor.

15. The method of claim 8, further comprising receiving by an attribute set-up unit guard banded vertex attributes from the guard band clipping system and setting up attribute deltas for each respective primitive to be rendered.

16. A guard band clipping system in a graphics processor pipeline, comprising:

a state machine configured to receive state data and transformed vertices;

a vertex index buffer coupled to the state machine;

a vertex buffer indexed by the vertex index buffer, the vertex buffer configured to save the transformed vertices;

a vertex processor coupled to the vertex index buffer, the vertex processor configured to generate clip codes for vertices and perform perspective correction of attributes corresponding to vertices resulting from clipped primitives;

a trivial rejection module configured to perform trivial rejection based on evaluation of the clip codes;

a guard band clipping module configured to determine whether guard band clipping is to be performed on a primitive based on evaluation of the clip codes; and a guard band clipping arithmetic logic unit configured to clip the primitive responsive to the determination that the primitive is to be clipped, the guard band clipping arithmetic logic unit further configured to perform interpolation to define coordinates of new clipped vertices;

wherein, responsive to a guard band clipping operation performed by the guard band arithmetic logic unit, the guard band clipping module is further configured to request an interruption of normal processing by the vertex processor.

* * * * *